Patented Aug. 27, 1935

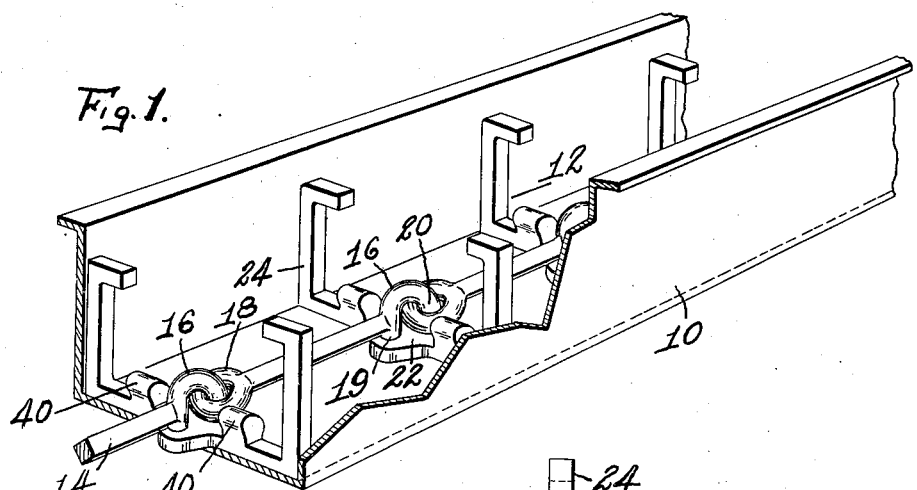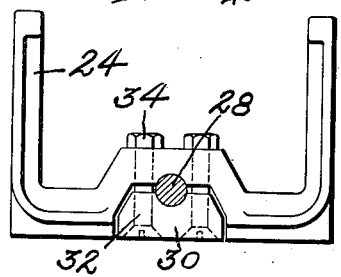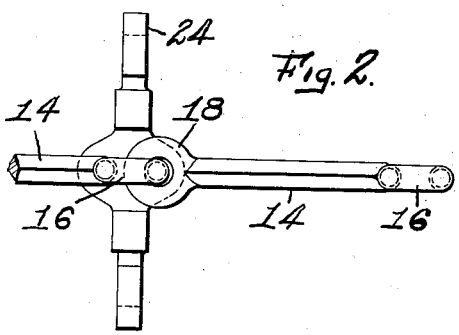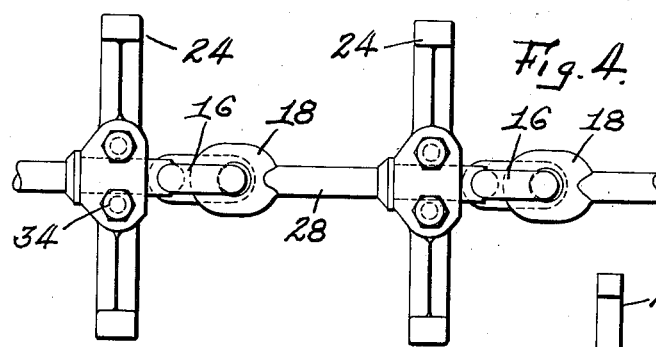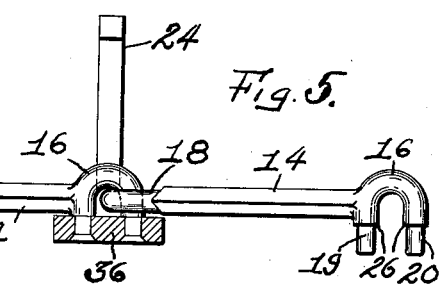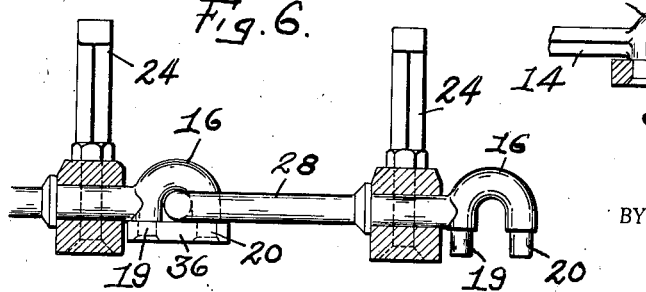

2,012,831

UNITED STATES PATENT OFFICE 2,012,831

CONVEYER

Arnold Redler, Severnsea, Sharpness, England, assignor to Redler Conveyor Company, Quincy, Mass., a corporation of Massachusetts Application January 3, 1934, Serial No. 705,069
In Great Britain October 4, 1933

4 Claims. (Cl. 198—168)

This invention relates to a conveyer, and particularly to a conveyer of the type forming the subject matter of the Redler Reissue Patent No. 18,445.

One object of the invention is to provide a conveyer of the character specified with a conveying member made up of a series of directly and pivotally connected tension members to thereby enable the stresses set up during the operation of the conveyer to be transmitted directly from one tension member to another.

The invention has for a further object to provide a novel and improved conveying member for a conveyer of the character specified which is adapted for commercial production at minimum expense and may be made of high tensile steel.

With these objects in view and such others as may hereinafter appear, the invention consists in the conveyer and in the conveying member hereinafter described and particularly pointed out in the claims at the end of this specification.

In the drawing, Fig. 1 is a perspective with portions broken away illustrating a portion of a conveyer embodying the present invention; Fig. 2 is a plan of a portion of the conveying member illustrated in Fig. 1; Fig. 3 is a sectional view of a modified form of conveyer member illustrating the manner in which a flight may be mounted upon one of the conveying elements; Figs. 4 and 5 are views in plan and vertical section, respectively, illustrating the conveying member formed by mounting the flights as illustrated in Figs. 3 and 2 respectively; and Fig. 6 is a side elevation with parts in section of the conveying elements shown in Fig. 4.

In general, the present invention contemplates a conveyer of the type forming the subject matter of the Redler Reissue Patent No. 18,445 which is characterized by the provision of a conduit through which a conveyer member having a series of skeleton or open flights is arranged to be drawn to effect the conveyance of solid flowable material in a continuous stream, and the invention contemplates the provision of a novel and improved construction of conveying member for such a conveyer. The conveyer member comprises a plurality of directly pivotally connected tension members upon which a plurality of open flights are mounted in a manner such as to permit the direct transmission of the stresses set up in the conveyer member during the operation of the conveyer from one tension element to the next. In the preferred form of the invention, the individual tension members are preferably formed of high tensile steel, of a relatively light weight, and preferably with a hook at one end and an eye at the other end of each element. The series of elements are assembled together to form the conveyer member with one leg of the hook of one element extended through the eye of the next succeeding element to form the continuous tension member of the conveyer, and provision is made for mounting the individual open flights upon the elements preferably in a manner such as to form a closure for the hooks while permitting the direct transmission of stress of one tension element to the next.

Referring now to the drawing, 10 represents the conveyer casing through which the conveying member indicated generally at 12 is arranged to be drawn by any suitable means, all as disclosed in the Redler reissue patent above referred to. The conveying member 12 is in accordance with the present invention made up of a series of directly connected tension elements 14. Each element 14 is preferably provided with a hook 16 at one end and an eye 18 at the opposite end. The hook 16 is preferably provided with two legs 19, 20, and the forward leg 20 is arranged to extend through the eye 18 of the next succeeding tension element to directly and pivotally connect the two elements together.

In the form of conveyer member illustrated in Figs. 1, 2 and 5, the two legs 19, 20 of the hook member 16 of the tension elements 14 are arranged to project through holes formed in a flattened portion 22 of an open conveyer flight 24 herein shown as of U-shape, and the ends of the legs 19, 20 are headed to securely rivet the hook to the flattened portion 22 of the flight to thereby effect the mounting of the flight upon the conveyer member and at the same time to effect a closure of the hook and retain the eye 18 within the hook. In practice the projecting legs 19, 20 of the hook 16 are reduced to form a shoulder 26 which serves as a bearing for engagement with the upper surface of the flattened portion 22 of the flight.

In some instances it may be desirable to mount the flights upon the shank portion 28 of the individual tension elements 14, and this may conveniently be accomplished by constructing the flights as illustrated in Figs. 3 and 4. As therein shown the flight 24 is provided with a clamping block 30 adapted to clamp the shank 28 of the tension element between it and the central portion of the flight 24, suitable clamping bolts and nuts 32, 34 being provided to hold the parts in clamping position. The hooks 16 may and preferably will be closed by a closure plate 36 having holes through which the projecting ends 19, 20 of the hook are extended and headed to securely rivet the plate to the hook.

In the form of the invention illustrated in Figs. 1, 2 and 5, the flight is preferably provided with bearing members 40 formed as an integral part thereof which serve for engagement by the usual sprockets over which the conveyer member is adapted to run in the practical operation of the conveyer. It will also be observed that the individual tension elements are so constructed that either the hook or the eye is arranged horizontal and the other vertical so that in the assembled conveyer member the flights will be more or less centralized within the casing by this arrangement of the hooks and eyes.

From the description thus far, it will be observed that the present construction of tension elements is simple and one which lends itself particularly to economical drop forging of the elements from high tensile steel, and after formation the elements are preferably heat treated, thus enabling the ultimate conveyer member to be constructed of maximum strength and of minimum weight. This is particularly advantageous in commercial operation and in the longer lengths of the conveyer wherein the maintenance of the dead weight of the conveyer element at a minimum comprises an important factor in enabling the conveyer to operate with minimum power and with minimum breakage of the parts.

While the preferred embodiments of the present invention have been herein illustrated and described, it will be understood that the invention may be embodied in other forms within the scope of the following claims.

Having thus described the invention, what is claimed is:—

1. In a conveyer, a conveying member comprising a plurality of tension elements, each provided with an eye at one end and with a hook member at the other end, the hook member of one element being hooked through the eye of the next succeeding element, the plane of the hook being disposed at right angles to the plane of the eye, said hook and eye being constructed and arranged to permit pivotal movement of the tension elements in two directions at right angles to one another, a plurality of flight members mounted upon said elements and in spaced relation, and means for closing the hook members of said elements to directly and pivotally connect together the different tension elements.

2. In a conveyer, a conveying member comprising a plurality of tension elements, each element being provided with an eye at one end and with a hook portion at the other end, said hook portion having two legs, and said elements being connected together by hooking one leg of the hook portion of one element through the eye of the next succeeding element, a plurality of flights mounted upon the conveyer member, each flight having openings through which the ends of said legs are extended to secure the flight upon the conveyer and to close the hook.

3. In a conveyer, a conveyer member comprising a plurality of open flights, said flights being provided with flattened portions having holes therethrough, and a series of tension elements, each element being provided with a hook portion at one end having two projecting legs and with an eye at the other end, said legs of the hook portions of said elements being extended through the holes in said flattened portions of the conveyer flights and secured thereto, whereby to close the hooks, and one leg of each hook extending through the eye of a succeeding element whereby the eyes are retained within the hooks by said conveyer flights.

4. In a conveyer, a conveying member comprising a plurality of directly and pivotally connected tension members, each member being provided with an eye at one end thereof, and a hook at the other end thereof, and with the hook of one element hooked through the eye of the next succeeding element, a plurality of open flight members mounted upon said elements and in spaced relation, said hooks and eyes being constructed and arranged whereby to permit pivotal movement of the tension elements in two directions at right angles to one another.

ARNOLD REDLER.